Figure 1:
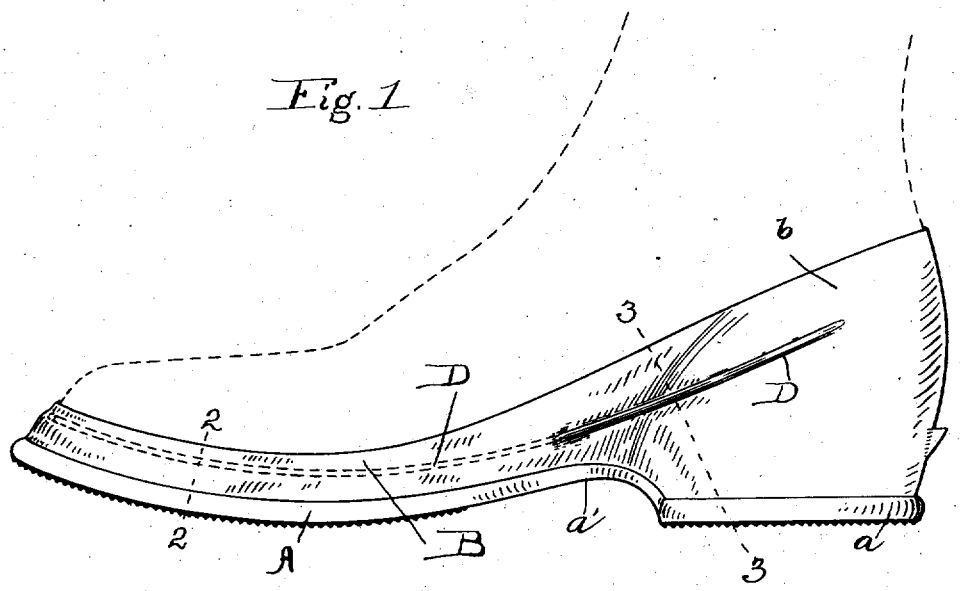

No. 12,822. REISSUED JULY 7, 1908.

N. P. BOWLER.

OVERSHOE.

APPLICATION FILED SEPT. 26, 1907.

Witnesses:

A. L. Lord.

Ras Weiss

Inventor.

Noadiah P. Bowler, by Brockett & Lewis.

Attorneys.

UNITED STATES PATENT OFFICE.

NOADIAH P. BOWLER, OF CLEVELAND, OHIO, ASSIGNOR TO THE EVERSTICK PATENTS COMPANY, A CORPORATION OF OHIO.

OVERSHOE.

No. 12,822. Specification of Reissued Letters Patent. Reissued July 7, 1908.

Original No. 858,565, dated July 2, 1907, Serial No. 291,178. Application for reissue filed September 26, 1907. Serial No. 394,774.

*To all whom it may concern:*

Be it known that I, NOADIAH P. BOWLER, a citizen of the United States, residing at Cleveland, in the county of Cuyahoga and State of Ohio, have invented a certain new and useful Improvement in Overshoes, of which the following is a full, clear, and exact description, reference being had to the accompanying drawings.

This invention is an improvement on the rubber overshoe which forms the subject matter of Letters Patent No. 736,156 granted to A. E. Roberts on August 11, 1903.

It has been found in the manufacture of overshoes under the patent mentioned that the continuous inelastic cord or member passing around the heel midway between the upper and lower edges thereof must be drawn so tightly upon the shoe, in order that the overshoe may hold, that it is very difficult to remove it and in many instances the tension on this inelastic member or cord has caused a chafing of the leather and sometimes even a cutting of the shoe of the wearer. It has also been found in practice that shoes constructed under the Roberts's patent must be fitted very tightly in order to stay on at all and the exact size must be obtained else there will be injury to the inserted shoe as will appear from what has already been brought out.

It has been further demonstrated by experience that by inclining the inelastic member upward at the shank toward the upper edge of the heel or counter a beneficial result is obtained in that the shank portions of the upper are drawn tightly against the upper of the inserted shoe and wrinkles at this point are done away with and further this upward pull around the bulge of the heel tends to maintain the inelastic member around the sole portion of the upper, taut at all times and retains the overshoe firmly in place.

In view of the above observations the present invention has been devised for the purpose of doing away with the undesirable features and producing an overshoe which may be easily fitted, which may be readily taken on and off, which will hold at all times after it has been once fitted and which will not mar or injure the inserted shoe.

With the above objects in view the present invention consists of an overshoe having a thickened and substantially inelastic heel portion capable of just a slight degree of give or elasticity and an upper which is in the form of a narrow strip around the edge of the sole and widens out gradually at the shank on both sides to the height of the forward edges of the heel or counter, together with a bead extending inward from the upper about the sole portion and adapted to be forced by a tension member or binder into the crease just above the sole of the shoe. This tension member or binder is arranged to extend throughout the entire upper and is secured to the counter from the front edges thereof back about midway where it terminates and is secured in the counter itself, whereby the slight degree of elasticity in the heel may be exerted directly upon the ends of this tension member thereby pulling it tightly about the shoe and further tending to hold the side portions of the upper at the shank close in against the shank of the shoe and prevent the gaping open of this part of the overshoe and also the formation of wrinkles.

The invention further resides in certain features set forth in the following description, drawings and claims.

Figure 2:
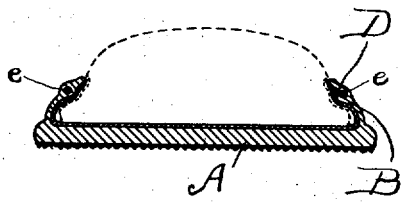
Figure 3:
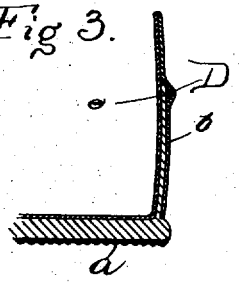

Referring to the drawings Figure 1 is a side view of an overshoe embodying the present invention. Fig. 2 is a sectional view in the plane indicated by the line 2—2 of Fig. 1, and Fig. 3 is a sectional view in the plane indicated by the line 3—3 of Fig. 1.

Any preferred form and construction of overshoe may be provided with my invention so long as it possesses the necessary features but I have shown one form in the drawings which meets the requirements with great efficiency and in such embodiment A represents the sole of an overshoe of which *a* is the heel and *a'* is the shank.

The sole A is provided along its margin and co-extensive therewith, with a narrow upper A which widens out at the shank to meet the heel portion *b*. The upper B is provided around the sole portion with a bead B adapted to take above the sole and preferably into the crease formed between the upper and the sole of the inserted shoe. This bead is preferably formed by incorporating in the structure of the overshoe a tension member or binder preferably an inelastic cord which extends throughout the entire upper and inclines upward toward the upper forward portions of the heel on both sides where it is secured along the sides of such heel and terminating about midway so that whatever pulling force the heel may have will be conveyed directly to the tension member or binder, which preferably forms a backing for the bead D.

It will be readily seen that by reason of the slight degree of elasticity in the counter or heel the overshoe may be readily fitted and at the same time there will be no danger of the shoe marring the inserted shoe or injuring the foot of the wearer as is the case where the tension member is continued around the heel. It will also be readily seen that the inclining of the shank portions of the tension member upward toward the forward upward portions of the counter causes the pull to be exerted upward about the shank of the shoe thus closing any gaps which otherwise would occur between the upper at the shank and the shank of the inserted shoe.

It is preferable to construct the shoe in a manner such that the bead in the upper formed by the tension member is deflected outward at the shank and it is then sunk into the substantially inelastic heel portion.

Having described my invention, I claim:

1. As an article of manufacture, an overshoe, comprising a sole portion, a shank portion, a heel portion, an upper and a tension member or binder extending throughout said upper and adapted to engage above the sole and having its ends free of each other and anchored in the sides of the heel portion.

2. As an article of manufacture, an overshoe, comprising a sole portion, a shank portion, a heel portion, an upper, a bead carried by said upper and adapted to engage above the sole of the inserted shoe, and a tension member throughout said upper adapted to force said bead in toward the inserted shoe and having its free ends anchored in the side portion of the heel and spaced at a distance from each other whereby there is an intervening portion of the heel or counter between said ends.

3. As an article of manufacture, an overshoe, comprising a sole portion, a shank portion, a heel portion, an upper extending around the margin of the sole portion and secured in the sides of the heel portion, and a tension member or binder incorporated within the upper and inclining upward at the shank and anchored in and near the upper edge of the heel portion.

4. As an article of manufacture, an overshoe, comprising a sole portion, a shank portion, a substantially inelastic heel portion, an upper extending around the margin of the sole portion and broadening out to meet the sides of the heel portion, a bead adapted to extend inward from said upper about the sole portion, and a tension member or binder incorporated within the upper and inclined upward at the shank toward the upper part of the side portions of the heel and having its ends free of each other and anchored in the upper portion of the sides of said heel, said tension member or binder being adapted when made taut to force said bead in toward the inserted shoe above the sole thereof.

5. As an article of manufacture, an overshoe comprising a sole portion, a shank portion, a heel portion, an upper extending around the sole portion and along the sides of the shank and secured to the sides of the heel portion, a bead adapted to project inward from the upper about the sole portion, and an inelastic cord extending from the upper forward portions of the sides of the heel portion around the upper and adapted when made taut to force the bead into the crease above the sole of the inserted shoe.

6. As an article of manufacture, an overshoe comprising a sole portion, a shank portion, a heel portion, an upper extending around the sole and along the sides of the shank and secured to the sides of the heel portion, a bead adapted to project inward from the upper about the sole portion, and an inelastic cord having its ends secured near the upper forward portions of the sides of the heel portion and extending therefrom in a continuous piece around the upper and anchored in the same back of said bead to force the same into the crease above the sole of the inserted shoe.

7. As a new article of manufacture, an overshoe having a low front portion, a high heel portion, and intermediate inclined shank portions which merge into the front and heel portions referred to, the front and shank portions of the upper being made of flexible and elastic material, and the heel portion being substantially inelastic, combined with a cord which is embedded in the front part of the upper and forms an inwardly projecting bead, the said cord being deflected outward near the front of the shank portions and being then extended into the inelastic heel portion and being covered by an external bead.

8. An overshoe comprising a sole portion, an upper, a tension member carried by said upper and forming a loop about the sole portion, the ends of said tension member terminating in the sides of the shoe, and means extending around the heel portion and adapted to pull upon the side portions of said loop to create a tension around the toe of the inserted shoe.

9. An overshoe comprising a sole portion, an upper, an internal bead within said upper and adapted to take in the crease above the sole, a tension member also carried by said upper and arranged to draw said bead into said crease, the ends of said tension member terminating in the sides of the shoe, and means extending around the heel portion and adapted to pull upon the side portions of said loop to create a tension around the toe of the inserted shoe.

In testimony whereof I have hereunto set my hand this 18th day of September, 1907.

NOADIAH P. BOWLER.

Witnesses:
B. W. Brockett,
R. Weiss.